(12) United States Patent
Rakov et al.

(10) Patent No.: US 8,299,781 B2
(45) Date of Patent: Oct. 30, 2012

(54) REACTANCE SENSORS OF RADIAL POSITION FOR MAGNETIC BEARINGS AND BEARINGLESS DRIVES

(75) Inventors: Mikhail Rakov, Menlo Park, CA (US); Takashi Shinano, Phoenix, AZ (US)

(73) Assignee: Minebea Co., Ltd. (JP)

( * ) Notice: Subject to any disclaimer, the term of this patent is extended or adjusted under 35 U.S.C. 154(b) by 1272 days.

(21) Appl. No.: 12/044,835

(22) Filed: Mar. 7, 2008

(65) Prior Publication Data
US 2009/0224752 A1    Sep. 10, 2009

(51) Int. Cl.
G01B 7/14    (2006.01)
G01R 27/26    (2006.01)

(52) U.S. Cl. .................... 324/207.17; 324/658

(58) Field of Classification Search .......... 324/658, 324/207.17, 207.25
See application file for complete search history.

(56) References Cited

U.S. PATENT DOCUMENTS

| | | | |
|---|---|---|---|
| 4,477,810 A * | 10/1984 | Tanaka et al. | 340/870.37 |
| 4,562,430 A * | 12/1985 | Robinson | 324/660 |
| 5,084,643 A * | 1/1992 | Chen | 310/90.5 |
| 5,313,399 A * | 5/1994 | Beale | 701/124 |
| 5,384,527 A | 1/1995 | Rozman et al. | |
| 5,872,408 A | 2/1999 | Rakov | |
| 5,914,578 A | 6/1999 | Rakov | |
| 6,101,084 A | 8/2000 | Rakov | |
| 6,140,793 A | 10/2000 | Carr et al. | |
| 6,304,076 B1 * | 10/2001 | Madni et al. | 324/207.17 |
| 6,483,321 B2 * | 11/2002 | Brasseur | 324/660 |
| 6,492,911 B1 * | 12/2002 | Netzer | 340/870.37 |
| 6,525,506 B2 | 2/2003 | Jin | |
| 6,955,097 B1 * | 10/2005 | Madni et al. | 73/862.337 |
| 7,276,897 B2 | 10/2007 | Lee | |
| 7,282,878 B1 | 10/2007 | Rakov et al. | |
| 2002/0171381 A1 | 11/2002 | Miyazaki et al. | |
| 2004/0155613 A1 | 8/2004 | Sugiyama et al. | |

OTHER PUBLICATIONS

U.S. Appl. No. 11/724,951, filed Mar. 15, 2007, first named inventor: Rakov.
Office action of U.S. Appl. No. 11/724,951, mailed Mar. 26, 2008.
Hendershot, Jr. et al., "Design of Brushless Permanent-Magnet Motors", Magna Physics Publishing (1994), pp. 1-19.
Kenjo, "Electric Motors and Their Controls", Oxford University Press (1991), pp. 1-13.
Leonard, "Control of Electrical Drives", 2nd ed., Springer Verlag (1996), pp. 75-77 and pp. 155-177.

* cited by examiner

Primary Examiner — Jay Patidar
Assistant Examiner — David M. Schindler
(74) Attorney, Agent, or Firm — Fountainhead Law Group P.C.

(57) ABSTRACT

A radial position sensor includes a rotating element configured to rotate about an axis of rotation, which subject to displacement. The displacement from a first position to a second position can be represented by polar coordinates, e.g., $(\rho, \phi)$, where $\rho$ is a distance and $\phi$ is an angle. The sensor also includes a non-rotating emitting element configured to provide a plurality of electromagnetic fields and a non-rotating receiving element configured to receive the plurality of electromagnetic fields. The plurality of electromagnetic fields are electromagnetically coupled to the non-rotating receiving element through the rotating element. The electromagnetic coupling varies in dependence on the radial position of the axis of rotation of the rotating element. The non-rotating receiving element produces an output signal in response to the amount of coupling of the plurality of electromagnetic fields, and so the output signal is an indication of the radial position of the axis of rotation.

22 Claims, 7 Drawing Sheets

REACTANCE SENSORS OF RADIAL POSITION FOR MAGNETIC BEARINGS AND BEARINGLESS DRIVES

CROSS-REFERENCES TO RELATED APPLICATIONS

The present invention is related to U.S. Pat. No. 5,872,408, Feb. 16, 1999 and U.S. Pat. No. 6,101,084, Aug. 8, 2000, both of which are fully incorporated herein by reference for all purposes. The present invention is also related to commonly owned U.S. Pat. No. 7,282,878, filed Apr. 28, 2006 and pending U.S. application Ser. No. 11/724,951, filed Mar. 15, 2007, both of which are fully incorporated herein by reference for all purposes.

BACKGROUND OF THE INVENTION

The present invention is directed generally to the detection of radial position, and in particular to the use of reactance sensors, to indicate the radial position of the rotary elements of rotational devices.

Control of rotational electromechanical devices, such as electrical motors, typically requires knowledge of the position and/or speed of their rotors, and may further require information about the position of their axes of rotation. There are several ways to determine such parameters. First, the position of the rotor may be determined by an array of phototransistors and a special shutter coupled to the rotor shaft, or by using Hall-effect sensors. Such systems are described in T. Kenjo, Electrical Motors and Their Controls, Oxford University Press (1994), pp 176 and following. Second, the speed informative signal may be obtained by using a small permanent magnet tachometer generator, attached to the shaft, or by using magnetic or optical sensors for generating pulses for each angular increment of the rotor. Such systems are described in W. Leonhard, Control of Electrical Drives, 2nd ed., Springer Verlag (2001), pp 420 and following. Third, a resolver may be used to determine the position of the rotor by a two-phase (sine/cosine) signal at a carrier frequency modulated sinusoidally by the rotation of the rotor. Such a system is described in J. R. Hendershot, Jr. and T. Miller, Design of Brushless Permanent-Magnet Motors, Magna Physics Publishing (1994), pp 1-19. All these methods require precise mechanical placement of sensors, or galvanic contact between moving parts.

Conventionally, the moveable element of a rotary device is the informative element that indicates rotational (angular) position; i.e., the information signal (an electrical signal) is generated on the moveable element. It is therefore necessary to have some means for transferring the information signal from this moveable element to external processing circuitry. This is usually accomplished by the use of rings and brushes, flexible connectors, and so on. The use of brushes can introduce noise into the information signal. Brushless solutions exist, but they suffer from low signal to noise ratios, and can be mechanically cumbersome. More significantly, brushes create problems with reliability and require constant maintenance. It is highly desirable to form and deliver signals to and from the rotating parts of mechanical or electromechanical devices without the use of mechanical or galvanic contact and a complex sensor supporting system.

Conventional motor drive technology using mechanical bearings suffers from many limitations. For example, mechanical bearings require lubrication, which can lead to high maintenance cost. Additionally, mechanical bearings tend to wear out and need to be replaced. As motor drive technology evolves, magnetic bearings and bearingless drives have been introduced to reduce the need for bearing lubrication and bearing replacement. Such systems are described in A. Chiba et al., Magnetic Bearings and Bearingless Drives, Newnes, Elsevier, (2005). FIG. 1 is a diagram illustrating a conventional motor system 100 including magnetic bearings. The motor 104 is located between electromagnetic bearings 102 and 106. Each electromagnetic bearing 102 and 106 have coils to generate radial forces in two perpendicular radial axes (e.g., X-Y coordinates shown in the figure). A feedback control mechanism is used to maintain the axis of rotation at the center of the stator core. Accordingly, the X-Y position of the axis of rotation must be provided to the control system to control the strength of the magnetic forces generated by the bearings 102, 106 in order to maintain the proper positioning of the axis of rotation.

In conventional magnetic bearings and bearingless drives systems, Cartesian coordinates are usually used to control the radial position of the axis of rotation. As shown in FIG. 1, electromagnetic bearing 102 is controlled in two radial axis coordinates $x_1$ and $y_1$, and electromagnetic bearing 106 is controlled in two radial axis coordinates $x_2$ and $y_2$. Even though this technique may be adequate in certain applications, there are many limitations as discussed below.

Accordingly, it is desirable to have improved methods and systems for sensing the radial displacement of a rotating element in an electromechanical device, and more specifically in devices having magnetic bearings and bearingless drives.

BRIEF SUMMARY OF THE INVENTION

The present invention is directed to reactance (capacitive and inductive) sensors for mechanical and electromechanical devices. More particularly, this invention provides a method and system including reactance (capacitive and inductive) sensors indicative of the radial position of a rotational device, specifically the position of the axis of rotation of one of its rotating parts. Merely by way of example, the invention has been applied to sensing radial position of rotors of electrical motors of different types having magnetic bearings, and bearingless drives. But it would be recognized that the invention has a much broader range of applicability. For example, the invention can be applied to electromechanical motion devices in general.

In accordance with an embodiment of the present invention, a sensor includes a non-moving sensing element from which the informative signal indicative of the radial position is obtained. A passive moveable element is introduced between the non-moving sensing element and a source of electromagnetic energy. The passive element has special electromagnetic characteristics which affect the reactance coupling (i.e., electromagnetic coupling) of the electromagnetic excitation between the non-moving sensing element and the source of electromagnetic energy.

A sensor according to embodiments of the present invention can be capacitive or inductive, or a combination of capacitive and inductive elements. The movable passive element can be characterized by having a dielectric constant for capacitive variants, or a magnetic constant for inductive variants. Both of these variants of reactance sensors have similar constructions and similar forms of excitation and output informative signals.

According to a specific embodiment, the present invention provides a radial position sensor. The sensor includes a rotating element configured to rotate about an axis of rotation, which is subject to displacement. The sensor also includes a non-rotating emitting element configured to provide a plurality of electromagnetic fields and a non-rotating receiving element configured to receive the plurality of electromagnetic fields. The rotating element is disposed in juxtaposition to the non-rotating emitting element and to the non-rotating signal receiving element. The plurality of electromagnetic fields produced by the non-rotating emitting element is electromagnetically coupled to the non-rotating receiving element through the rotating element. The electromagnetic coupling of the plurality of electromagnetic fields between the non-rotating emitting element and the non-rotating receiving element varies as the axis of rotation of the rotating element is displaced from a first position to a second position. In the sensor, the non-rotating receiving element produces an output signal in response to exposure to the plurality of electromagnetic fields, and the output signal varies depending on the direction and amount of displacement of the axis of rotation.

In a specific embodiment, the displacement is characterized by a combination of an angular component and a radial component; the displacement can be said to be represented by polar coordinates, e.g., $(\rho, \phi)$ where $\phi$ is distance from the first position to the second position and $\phi$ is an angle subtended between reference line and a line connecting the first position and the second position. When the output signal is a time-varying signal, then a phase of the output signal is associated with the angular component ($\phi$) of the displacement and a magnitude of the output signal is associated with the radial component ($\rho$) of the displacement. In an embodiment, the non-rotating emitting element comprises a plurality of electrically isolated emitters, each emitter emitting one of the electromagnetic fields.

According to another embodiment of the present invention, a radial position sensor is provided. The sensor includes a plurality of emitters, which are electrically isolated from each other. Each of the plurality of emitters is configured to receive a respective one of a corresponding plurality of time-varying input electrical signals. The sensor also includes a receiving element disposed in juxtaposition to each of the plurality of emitters. The receiving element is coupled to each of the plurality of emitters by a respective electrical reactance. Additionally, the sensor includes a rotating element disposed between the emitters and the receiving element. The rotating element is configured to rotate about an axis of rotation, the axis of rotation being subject to displacement. The sensor also has an output terminal coupled to the receiving element for providing a time-varying output signal. A phase of the time-varying output signal is related to an angular component of the displacement, and a magnitude of the time-varying output signal is related to a radial component of the displacement. In a specific embodiment, the plurality of time-varying input electrical signals include N time-varying electrical signals that are 360°/N out of phase from one another, where N is an integer.

According to yet another embodiment of the present invention, a radial position sensor includes a emitting element which has a plurality of electrically isolated emitters. Each emitter is configured to produce a magnetic field when it is energized, thereby producing a plurality of magnetic fields when two or more of the emitters are energized. The sensor also includes a receiving element and a rotating element disposed in juxtaposition to the emitting element and to the receiving element. The rotating element is configured to rotate about an axis of rotation which is subject to displacement. The displacement can cause a change in electromagnetic coupling between the plurality of magnetic fields and the receiving element when the emitters are energized. In the sensor, the receiving element produces a single output signal when the plurality of magnetic fields are electromagnetically coupled thereto by the rotating element, characteristics of the single output signal depending on the displacement.

In a specific embodiment, each emitter includes an electromagnet and the receiving element includes a coil. The plurality of magnetic fields produced by the emitters are coupled to the coil thus inducing a flow of current in the coil. In the sensor, the single output signal is a measure of the flow of current. In an embodiment, the rotating element is substantially coplanar with the emitting element. The rotating element is connected to a shaft, and the receiving element is disposed about the shaft. In an embodiment, the characteristics of the single output signal includes a phase and a magnitude. The phase of the single output signal corresponds to an angular component of the displacement, and the magnitude of the single output signal corresponds to a radial component of the displacement.

According to an alternative embodiment, the invention provides a radial position sensor. The sensor includes a emitting element which has a plurality of electrically isolated emitters. Each emitter is configured to produce an electric field when it is energized, thereby producing a plurality of electric fields when two or more of the emitters are energized. The sensor also includes a receiving element and a rotating element disposed in juxtaposition to the emitting element and to the receiving element. The rotating element is configured to rotate about an axis of rotation, which is subject to displacement. The displacement causes a change in electromagnetic coupling between the plurality of electric fields and the receiving element when the plurality of emitters are energized. Additionally, the receiving element produces a single output signal when the plurality of electric fields are electromagnetically coupled thereto by the rotating element. The characteristics of the single output signal are dependent on the displacement.

In a specific embodiment, each emitter includes a conductive region and the receiving element includes a conducting plate. The plurality of electric fields produced by the emitters are coupled to the conducting plate thus inducing a voltage in the conducting plate. The single output signal is a measure of the voltage. In an embodiment, the characteristics of the single output signal include a phase and a magnitude. The phase of the single output signal corresponds to an angular component of the displacement, and the magnitude of the single output signal corresponds to a radial component of the displacement.

According to embodiments of the present invention, those elements of the radial position sensor that require an electrical connection do not rotate. This is a significant advantage because it obviates the need for brushes or the like which would be used to provide electrical contact to rotating surfaces and the disadvantages of having to use such brushes. In various embodiments, these sensors are characterized by uniformity of the information signal, high reliability and low maintenance costs because of absence of contacts or brushes, and simple construction that allowed them to be practically implemented using modern methods of mass production. Another benefit is in the simplification of further signal processing. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention is directed to reactance (capacitive and inductive) sensors for mechanical and electromechanical devices. More particularly, this invention is directed to reactance sensors to sense the radial position of rotational devices. Still more particularly, this invention provides a method and systems for reactance sensors that sense the displacement of the position of an axis of rotation of a rotational device. Merely by way of example, the invention has been applied to sensing the radial position (relative to a reference position) of rotors of electrical motors of different types having magnetic bearings, and bearingless drives. But it would be recognized that the invention has a much broader range of applicability. For example, the invention can be applied to electromechanical motion devices in general to sense the position of an axis of rotation of the device with respect to a reference position.

Figure 1:
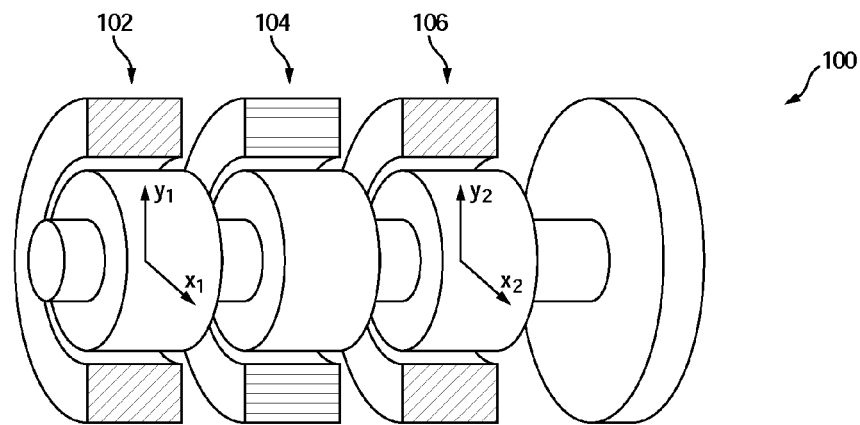
FIG. 1 is a view diagram illustrating a conventional motor system including magnetic bearings.

As discussed above in connection with FIG. 1, in conventional magnetic bearings and bearingless drives systems, radial axis coordinates are used to control the radial position of the axis of rotation. That is, conventional sensors of radial position use Cartesian coordinates: (x, y). An x-direction sensor provides position signals for positions $x_1$ and $x_2$ along the X coordinate, and a y-direction sensor provides position signals for positions $y_1$ and $y_2$ along the Y-coordinate. The actual position of the rotor is calculated as a function of differences between respective position signals of the four sensors; e.g., $x_1-x_{01}$, $y_1-y_{01}$, $x_2-x_{02}$, and $y_2-y_{02}$, where $x_1$, $y_1$ and $x_2$, $y_2$ are actual and $x_{01}$, $y_{01}$, and $x_{02}$, $y_{02}$ are reference (central) coordinates of the axes, respectively.

Figure 2:
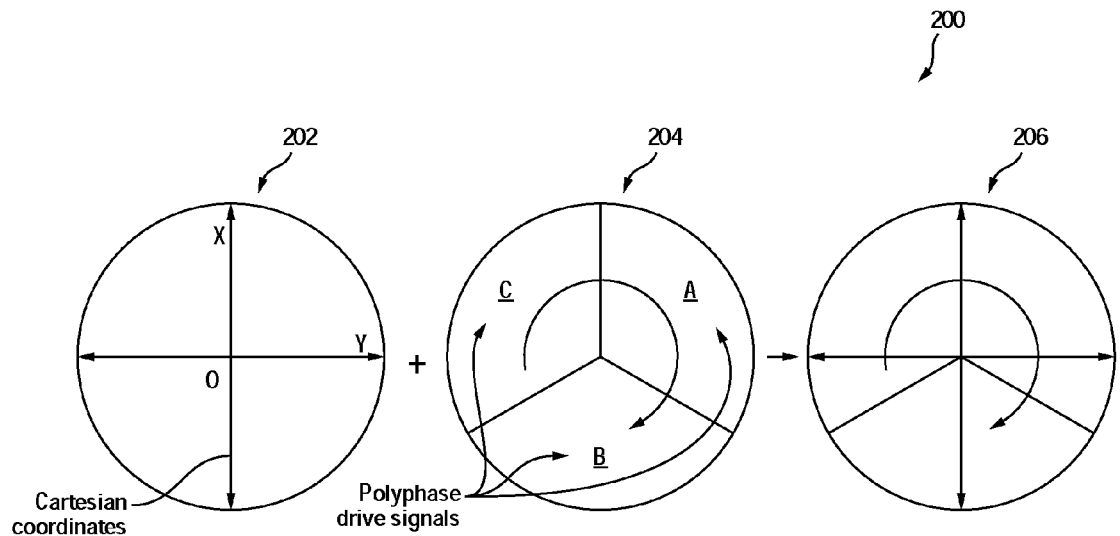
FIG. 2 is a view diagram illustrating a conventional method for radial position sensing.

FIG. 2 is a view diagram illustrating a conventional method for radial position sensing. As shown, drawing 202 illustrates the x and y components of the Cartesian coordinates based sensor signals. Drawing 204 illustrates the geometry of a torque-producing part of electromechanical devices (e.g., a stator). For example, the stator may have a polyphase construction that is driven by suitable polyphase driving signals. Drawing 206 illustrates a combination of the Cartesian coordinates based sensing and the rotational property of the electromechanical device. This system is rather complicated and its accuracy seems to be limited. A limitation is that such a sensor system is not topologically compatible with the geometry of the torque-producing part of electromechanical devices. As a consequence, the system of sensors, bearings, and torque-producing parts, such as shown in 206, tends to be rather complicated, clumsy, and expensive in fabrication.

Accordingly, it is desirable to have an improved radial position sensor, for example, to determine a the position of rotor axis with respect to the stator axis. Such sensors would be useful in applications of electromagnetic devices such as magnetic bearings and bearingless drives.

Figure 3A:
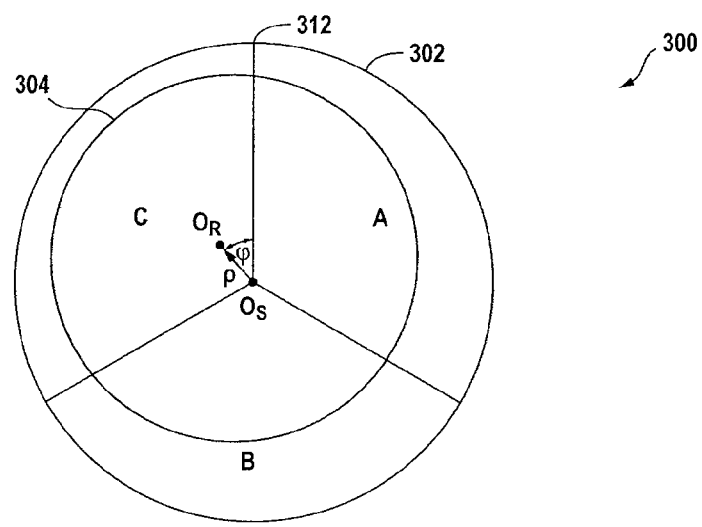
FIGS. 3A-3B are simplified view diagrams illustrating a method for a radial position sensor that uses polar rather than Cartesian system of coordinates according to an embodiment of the present invention.

FIG. 3A is a simplified view diagram illustrating a method for sensing radial position in polar coordinates according to an embodiment of the present invention. This diagram is merely an example and should not unduly limit the scope of the claims herein. One of ordinary skill in the art would recognize other variations, modifications, and alternatives. As shown, an emitting element 302 includes three electrically isolated pads or signal sources A, B, and C. The center $O_S$ of the emitting element 302 is aligned to an initial center axis of a rotational system, such as a motor; for example, the initial center axis position can be the longitudinal axis of the stator element of a motor.

A rotating element 304 has an axis of rotation $O_R$ which is originally aligned with $O_S$, but is subject to a radial displacement. FIG. 3A shows the rotating element having been displaced radially to a new position off of center $O_S$. The original radial position of the rotating element 304 will be referred to herein variously as the reference position, initial radial position, starting position, the original radial position, and so on. It is understood that the rotating element 304 can have any initial position and need not be aligned with $O_S$. As will become clear, the invention is directed to sensing displacement of the radial position of the rotating element 304 from its original radial position, so its initial radial position is not relevant to the basic teachings of the present invention.

In an embodiment of the present invention, a displacement vector from $O_S$ to $O_R$ is characterized by a radial component $\rho$ and an angular component $\phi$. The angle $\phi$ is an angle subtended between a line connecting $O_S$ and $O_R$ and a reference line. In the particular embodiment shown in FIG. 3A, the reference line is the seam 312 between the signal source pad C and the signal source pad A.

Figure 3B:
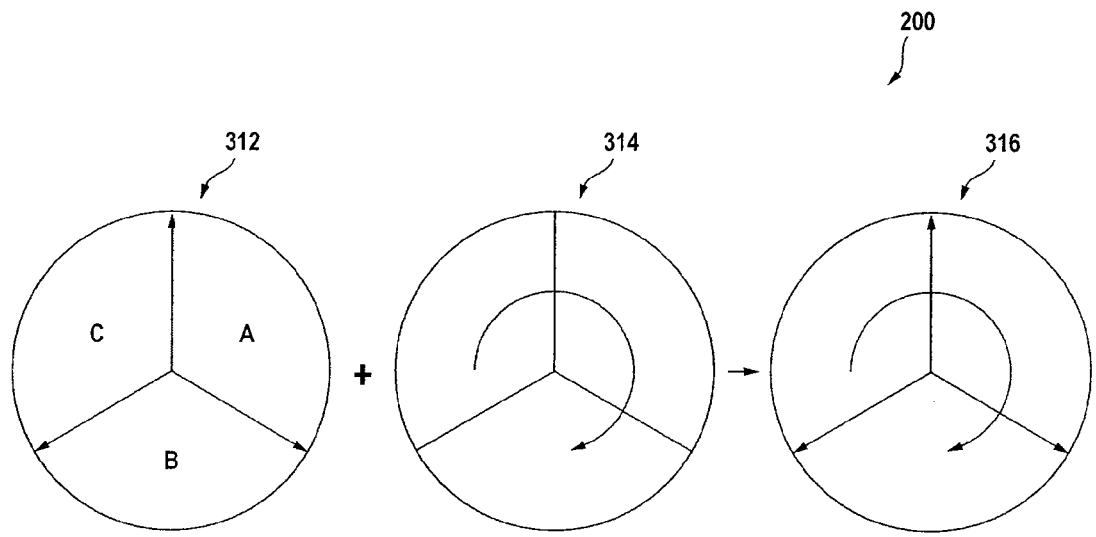

FIG. 3B is a simplified view diagram illustrating a method for a radial position sensor that uses a polar coordinate system rather than a Cartesian system of coordinates, according to another embodiment of the present invention. As shown in drawing 312, the sensor is based on polar coordinates and provides multiphase sensing signals. Drawing 314 illustrates the rotation of the electromechanical device. Drawing 316 illustrates a combination of the polar coordinates based sensor and the rotational device. The radial position sensor is configured to indicate radial position relative to a reference radial position, e.g. deflection of rotor axis from the desirable position relative to the stator axis. A benefit of this approach stems from the fact that sensors, bearings, and torque-producing parts of electromechanical devices can utilize the identical basic polyphase topology. As a result, a complete system presenting an organic combination of these component parts tends to be constructively simple and easy in fabrication.

In a specific embodiment of the invention, a polyphase system includes a number of phase-shifted voltages $U_i$ (i=1, 2, . . . ) and corresponding reactances $X_i$. Such a system is balanced under the condition that all voltages and all reactances are equal. Under this balanced condition, the current through the load resistance $R_L$ and the voltage on $R_L$ are equal to zero. When the axis of rotation of the rotating element is displaced from its initial reference position, the output signal of the sensor has the following form:

$$U_{OUT} = U_m (\sin \omega t + \phi) \quad \text{EQN 1}$$

This equation relates the output signal to the displacement illustrated in FIG. 3A. The phase component $\phi$ is related to the direction of displacement $\phi$ and the magnitude component $U_m$ is related to the magnitude of displacement $\rho$. This vector form of output, where just one signal contains information about character of deflection, makes further processing simple and promises better accuracy of positioning than the existing multiple sensors based on Cartesian coordinates. Moreover, this approach significantly simplifies the overall construction of the system and technology of its production. Further details of the invention are found throughout the present specification and more particularly below.

Figure 4A:
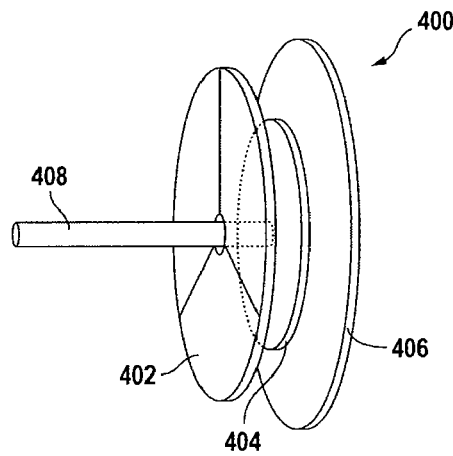
FIG. 4A is a simplified perspective view diagram illustrating a radial position sensor 400 according to an embodiment of the present invention.

FIG. 4A is a simplified perspective view diagram illustrating a radial position sensor 400 according to an embodiment of the present invention. This diagram is merely an example and should not unduly limit the scope of the claims herein. The sensor includes a rotating element 404, a non-rotating emitting element 402, and a non-rotating receiving element 406. In this particular embodiment, the rotating element 404 is disposed in juxtaposition between the emitting element 402 and the receiving element 406. The rotating element 404 is spaced apart from the emitting element 402 and from the receiving element 406. One of ordinary skill will readily appreciate that other configurations may be equally suitable. The emitting element 402 and the receiving element 406 are of conductive material. As discussed below, the rotating element 404 can include a suitable dielectric material. Together, these components constitute a capacitive sensor device. That is, the radial displacement of the rotating element 404 can cause a change in the capacitance of the system. In an example, the rotating element 404 can be coupled to a moveable element of a rotary device through shaft 408. The position of the moveable element of the rotary device can then be determined from the change in capacitance caused by the displacement of the rotating element 404. Further details of the operation of the sensor are discussed below.

Figure 4B:
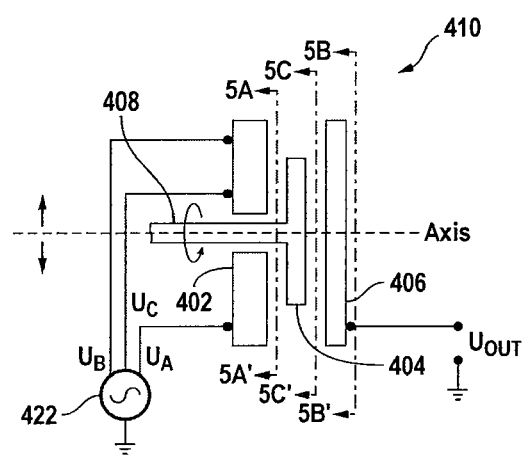
FIG. 4B is a simplified cross-sectional view diagram illustrating a radial position sensor system 410 according to an embodiment of the present invention.

FIG. 4B is a simplified cross-sectional view diagram illustrating a radial position sensor system 410 according to an embodiment of the present invention. This diagram is merely an example and should not unduly limit the scope of the claims herein. One of ordinary skill in the art would recognize other variations, modifications, and alternatives. In this particular embodiment, the sensor system 410 includes a capacitive sensor having a planar construction, and in particular a disk-shaped construction. In other embodiments, the sensor can have a cylindrical, tubular, or interleaving construction. Examples of various constructions are described in U.S. Pat. No. 5,872,408, Feb. 16, 1999 and pending U.S. application Ser. No. 11/724,951, filed Mar. 15, 2007, both of which are fully incorporated herein by reference for all purposes. The sensor system 410 includes a rotating element 404, a non-rotating emitting element 402, and a non-rotating receiving element 406. In this particular embodiment, the rotating element 404 is disposed in juxtaposition between the emitting element 402 and the receiving element 406. The rotating element 404 is spaced apart from the emitting element 402 and from the receiving element 406. One of ordinary skill will readily appreciate that other configurations may be equally suitable. The emitting element 402 and the receiving element 406 are of conductive material. As discussed below, the rotating element 404 can include a suitable dielectric material. Together, these components constitute a capacitive sensor device.

In a specific embodiment, the rotating element 404 is attached to a shaft 408. Rotation of the shaft 408 about its axis of rotation causes the rotating element 404 to rotate. An opening is provided through a center portion of non-rotating emitting element 402, through which the shaft 408 passes. This allows the shaft 408 to be mechanically connected to a device for which detection of its radial position is desired. For example, the shaft can be connected to the rotor of a motor having magnetic bearings, or bearingless drives, whose operation requires knowledge of the radial position of its rotor. Of course, any suitable configuration that allows for rotation of the rotating element 404 that does not require rotating the emitting element 402 or the receiving element 406 is appropriate. With respect to FIG. 4B, "radial position" refers to the displacement of the axis of rotation of the rotating element 404 in the radial direction.

FIG. 4B also shows a multiphase signal generator 422 for providing two or more input signals to the emitting element 402. Recall in FIG. 3A that the emitting element 302 comprises three electrically isolated signal source pads A, B, C. In this particular embodiment, the signal generator 422, or other suitable source of signals, is configured to provide three input signals $U_A$, $U_B$, and $U_C$ respectively to the isolated pads A, B, and C of the emitting element 402 of FIG. 4B. The receiving element 406 provides a single output signal $U_{OUT}$, resulting from the electromagnetic coupling of input signals $U_A$, $U_B$, and $U_C$ between the emitting element 402 and the receiving element 406, through the dielectric material of the rotating element 404. Of course, one of ordinary skills in the art would recognize other variations, modifications, and alternatives.

Figure 5A:
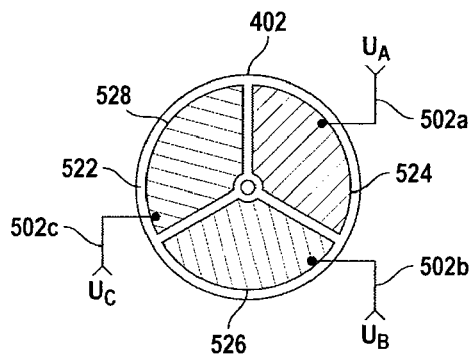
FIGS. 5A-5C are simplified diagrams showing additional details of the sensor 410 viewed along respective view lines 5A-5A', 5B-5B', and 5C-5C' shown in FIG. 4.
Figure 5B:
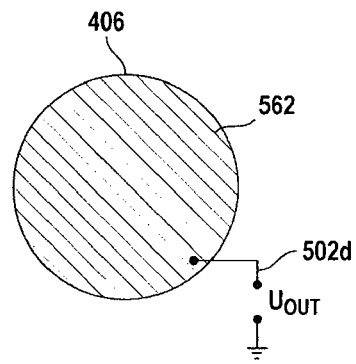
Figure 5C:
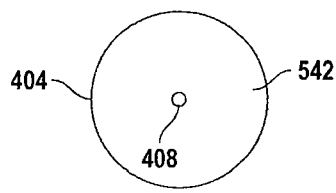

FIGS. 5A-5C are simplified diagrams showing additional details of the sensor 410 viewed along respective view lines 5A-5A', 5B-5B', and 5C-5C' shown in FIG. 4B. FIG. 5A is a face-on view (viewed along view lines 5A-5A'), showing further detail of emitting element 402. In accordance with the present invention, the emitting element 402 is configured to emit a plurality of electromagnetic fields during operation of the sensor 410. The specifically disclosed embodiment of the emitting element 402 is a disk-shaped element comprising three electrically isolated emitting regions. It will be understood, however, that the emitting element 402 is not necessarily disk-shaped and can comprise more than three such emitting elements, or as few as two emitting elements. For purposes of explanation, the discussions which follow will assume a three-element configuration and three-phase excitation.

As shown in FIG. 5A, the emitting element 402 comprises an underlying disk-shaped substrate 522 of nonconductive material. In a specific embodiment, disposed on the substrate 522 are three separate electrically conductive regions 524, 526, and 528, which divide the disk into equal areas and constitute the emitting elements in this particular embodiment of the invention. Each conductive region is substantially a 120° sector. The three electrically conductive regions 524, 526, and 528 are electrically isolated from each other. Each of the input signals $U_A$, $U_B$, and $U_C$ produced by the signal generator 522 is provided respectively to one of the electrically conductive regions 524, 526, and 528, for example, by way of a wire connection. It will be appreciated that other implementations of the emitting elements are possible. For example, in an alternative embodiment, the sensor can have N time-varying electrical signals that are 360°/N out of phase from one another, where N is an integer.

FIG. 5B shows a face-on view (viewed along view lines 5B-5B') of the receiving element 406. In accordance with the present invention, the receiving element 406 is configured to output a single output signal. The particular implementation of the receiving element 406 shown in FIG. 5B illustrates a single disk-shaped element of electrically conductive material 562. The electrically conductive material 562 can be disposed on a substrate (not shown) for mechanical stiffness. Although the shape of receiving element 406 is shown to match the shape of the emitting element 402, it will be apparent that the present invention does not impose such a restriction of matching shapes.

Since the emitting element 402 and the receiving element 406 do not rotate, it is a simple matter to provide electrical connections to these elements to energize the emitter regions of the emitting element 402 and to measure or otherwise sense the single output signal $U_{OUT}$ on the receiving element 406. For example, FIG. 5A shows wires 502a, 502b, 502c soldered or otherwise electrically connected respectively to the conductive regions 524, 526, and 528. In this way, a source of signals such as signal generator 422 can provide individual signals respectively to the conductive regions 524, 526, and 528 without the need for brushes as compared to conventional devices where the emitting element is a moving part.

FIG. 5B similarly shows a wire 502d soldered or otherwise electrically connected to the electrically conductive material 562. In this way, the output signal $U_{OUT}$ that appears on receiving element 406 can be measured or otherwise detected by a suitable detection device (not shown) without the need for brushes as compared to conventional devices where the receiving element is a moving part. In a practical application of the present invention, the output signal can be fed into a controller (not shown) which would then perform control functions based on the measured output signal. As discussed above and further explained below, the output signal has information pertaining to the radial displacement of the rotating element 404. The magnitude $U_M$ is proportional to the distance ρ of the rotating element 404 from its initial radial position. The phase φ is the phase difference between $U_{OUT}$ and the signal that is output from the receiving element 406 when the rotating element 404 is positioned in the initial radial position. In a specific embodiment, the phase φ is proportional to the subtended angle φ described above.

FIG. 5C shows a face-on view (viewed along view lines 5C-5C') of rotating element 404. The shaft 408 connected to the rotating element 404 can be seen in cross-section. In a specific embodiment, the rotating element includes a dielectric material characterized by a dielectric constant $\in_1$. Practically, the dielectric constant should be sufficiently greater than that of air which is defined by the constant of the air, $\in_0$. In other embodiments, the rotating element 404 can include combinations of materials having different dielectric constants. For example, the rotating element 404 can comprise three or more portions each having a different constant.

In operation, the input signals $U_A$, $U_B$, and $U_C$ produced by the signal generator 422, or other suitable source of signals, are applied respectively to the conductive regions 524, 526, and 528 of the emitting element 402. For example, FIG. 5A shows that input signal $U_A$ is applied to conductive region 524, input signal $U_B$ is applied to conductive region 526, and input signal $U_C$ is applied to conductive region 528. Since the conductive regions 524, 526, and 528 are electrically isolated from each other, three separate electromagnetic fields will emanate from the emitting element 402.

Figure 6:
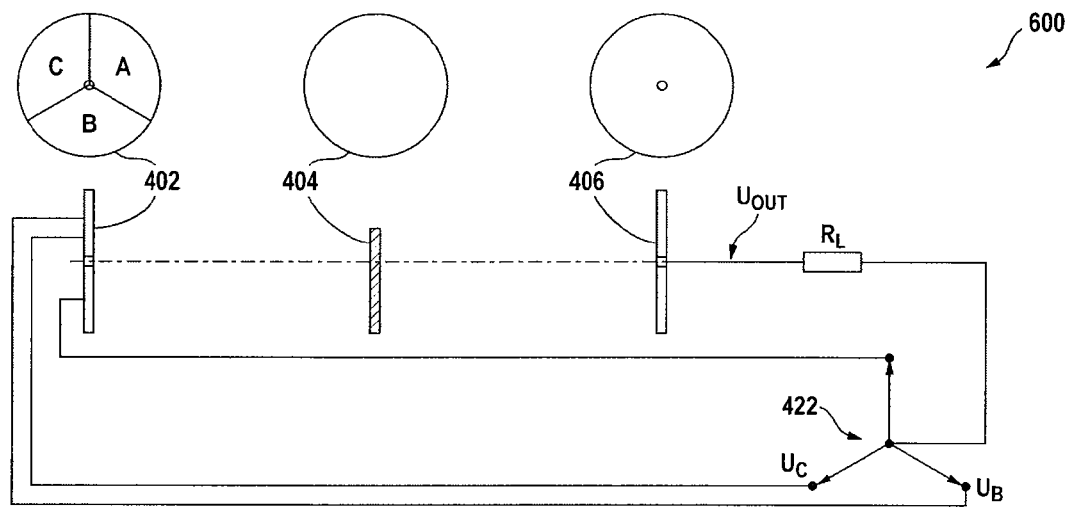
FIG. 6 is a simplified schematic diagram of the sensor 410 shown in FIG. 4 according to an embodiment of the present invention.

FIG. 6 is a simplified schematic diagram for sensor system 600 shown according to an embodiment of the present invention. The notation used in this figure is conventional notation used in describing multiphase systems. An example of sensor system 600 is discussed above in connection the sensor system 410 shown in FIGS. 4 and 5. Referring to FIGS. 4 and 5, schematic diagram in FIG. 6 illustrates components for driving the emitting element 402 and measuring the single output signal $U_{OUT}$ of the receiving element 406. As shown, the rotating element 404 is disposed in juxtaposition to the non-rotating emitting element 402 and to the non-rotating signal receiving element 406. In a specific embodiment, the output signal is used to derive information related to the radial position of the rotating element 404. Reference numeral 422 identifies a general representation of a multiphase signal source, in this case a three-phase source. Each phase serves as one of the input signals $U_A$, $U_B$, and $U_C$. The output signal $U_{OUT}$ is usually measured as a voltage across a load resistance $R_L$.

The specific embodiment in FIG. 6 is a capacitive sensor, so the electromagnetic fields are electric in nature, and are also referred to as electric fields. The presence of the three electric fields emanating from the emitting element 402 causes charge variations on the conductive material 562 of the receiving element 406. Since the electric fields are time-varying, the receiving element 406 will experience harmonic variations in charge. These variations in the charge can be measured to produce the single output signal $U_{OUT}$ by measuring the voltage potential of the conductive material 562. Since the input signals $U_A$, $U_B$, and $U_C$ are time-varying signals, each of the three electric fields emanating from emitting element 402 is time-varying. The output signal $U_{OUT}$ of the receiving element 406 is therefore a single time-varying voltage that is the result of the combined effect of the three electric fields on the conductive material 562. An example of the output signal $U_{OUT}$ of the receiving element 406 is discussed in more detail below.

Figure 7:
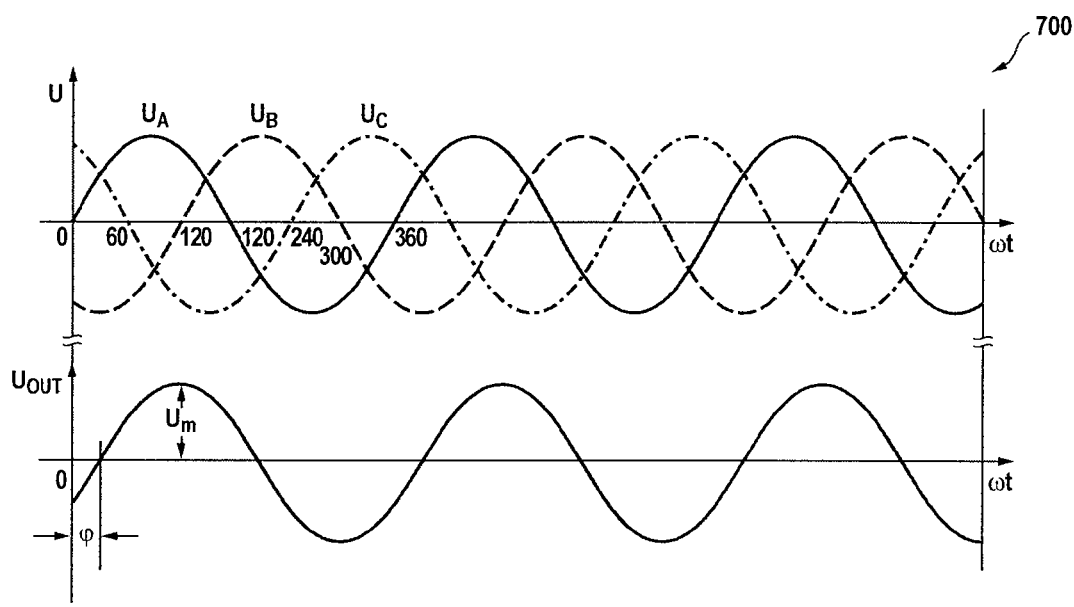
FIG. 7 is a simplified diagram illustrating signal waveforms produced in the circuit of FIG. 6.

FIG. 7 is a simplified diagram illustrating electrical waveforms produced in the sensor system 600 of FIG. 6 according to an embodiment of the present invention. In this particular embodiment, the input signals $U_A$, $U_B$, and $U_C$ are harmonic signals which are 120° out of phase with respect to each other. Input signal $U_B$ is seen to be shifted in phase by 120° relative to input signal $U_A$. Input signal $U_C$ is 120° phase shifted relative to input signal $U_B$. Thus, emitting element 402 can be said to be driven by a polyphase excitation signal, and in this particular embodiment by a three-phase excitation signal, where each phase is defined as follows:

$$U_A = U \sin \omega t$$

$$U_B = U \sin(\omega t + 120°)$$

$$U_A = U \sin(\omega t + 240°) \qquad \text{EQN 2}$$

where U is a predetermined amplitude. However in alternative embodiments, emitting element 402 can include N emitter regions that are driven by an N-phase input signal. In other words, the sensor can have N time-varying electrical signals that are 360°/N out of phase from one another, where N is an integer.

In a capacitor, the dielectric material affects the rate of variation of charge. In accordance with a specific embodiment of the present invention, the rotating element 404 includes dielectric material. The initial position of the axis of rotation can be determined when all excitation, rotating, and receiving elements are concentrically aligned. This produces a zero output on the load resistor which serves as a nice reference output. However, the initial position can be some non-concentric alignment of the elements. This would produce a non-zero output as a reference output; however, the important thing is that deviations from this initial position can still be detected because the output will still vary from the reference output.

During operation the axis of rotation of the rotating element 404 may be displaced from an initial central position which can be used as a reference point. The displacement of the radial position of the dielectric material of the rotating element 404 between the conductive regions 524, 526, and 528 of the emitting element 402 and the electrically single conductive material 562 of the receiving element 406 will therefore change. Consequently, the capacitance between the emitting element 402 and the receiving element 406 will change as the rotating element 404 is radially displaced from the reference position. The effect created by the radial displacement of the rotating element 404 can be seen as changes in magnitude and phase in the output signal $U_{OUT}$ of the receiving element 406.

As discussed above in connection with FIG. 3, when the axis of rotation of the rotating element is displaced from its initial reference position, the output signal of the sensor is defined by interaction of exciting signals (EQN 2) and variable capacitors formed by the exciting, rotating, and receiving elements. This interaction relates the output signal to the radial displacement of the axis of rotation described in FIG. 3A, as discussed below.

In accordance with an embodiment of the present invention, there is a one-to-one correspondence between the physical radial displacement of the rotating element 404 and the output signal $U_{OUT}$ with respect to one of the input signals $U_A$, $U_B$, or $U_C$ serving as a reference signal. The phase and magnitude components of the output signal can be used to determine the direction and magnitude of the displacement of the axis of rotation. This can be accomplished simply by monitoring changes in the output signal $U_{OUT}$. At a given reference radial position of the rotating element 404, there will be a corresponding change in the output signal $U_{OUT}$. In a specific embodiment, the phase component φ is related to the direction of displacement φ and the magnitude component $U_m$ is related to the magnitude of displacement ρ.

It is understood, of course, that in practice commonly known signal processing techniques may be required to obtain a usable signal. For example, A/D conversion may be needed to obtain a digital signal that a digital data processor can understand. There may be filtering of the measured output signal $U_{OUT}$ to filter out noise and amplification to improve the signal-to-noise ratio. These signal processing steps are commonly performed on any measured signal in order to obtain a usable signal. It is noted that these signal obtaining steps are not performed for the purpose of determining radial position, but only for the purpose of obtaining a usable signal. In accordance with a specific embodiment of the present invention, the usable signal thus obtained requires no additional signal manipulations beyond being compared to a reference signal in order to ascertain a radial position.

Figure 8:
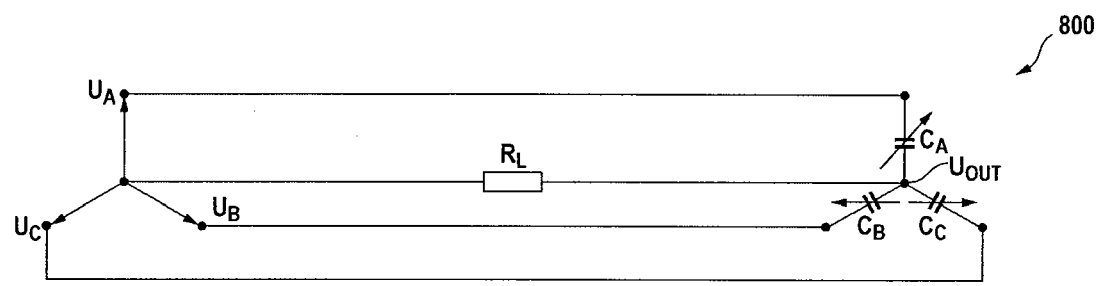
FIG. 8 is a simplified schematic diagram illustrating a capacitive sensor of radial position according to an embodiment of the present invention.

FIG. 8 is a simplified schematic diagram illustrating an equivalent circuit for a capacitive sensor system 800 of radial position according to an embodiment of the present invention.

An example of a capacitive sensor is shown above in connection to FIGS. 4 and 5. Here the equivalent circuit in FIG. 8 is discussed with reference to FIGS. 4 and 5. As shown, the three emitter regions A, B, and C, which comprise the emitting element 402 and the electrically single conductive material 562 of the receiving element 406 are coupled by three variable capacitors $C_A$, $C_B$, and $C_C$ connected in a star configuration to a common point $U_{OUT}$. The signal generator 422 produces input signals $U_A$, $U_B$, and $U_C$ as defined by equation EQN 2 given above. Each capacitor is driven by a different excitation source. The capacitors $C_A$, $C_B$, and $C_C$ are variable due to the changing location of the dielectric material of the rotating element 404 as its axis of rotation is displaced during rotation. In the example discussed above, the sensor uses capacitive coupling to determine a change in radial position of the axis of rotation.

Figure 9:
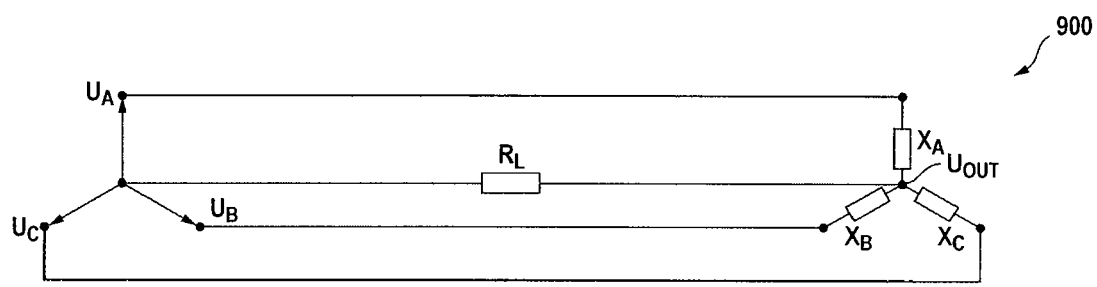
FIG. 9 is a simplified schematic diagram illustrating a reactance sensor of radial position according to an embodiment of the present invention.

FIG. 9 is a simplified schematic diagram illustrating a reactance sensor 900 according to an embodiment of the present invention. As shown, sensor 900 is substantially similar to sensor 800 of FIG. 8, with the variable capacitors $C_A$, $C_B$, and $C_C$ replaced by variable reactances $X_A$, $X_B$, and $X_C$, respectively. In a specific embodiment, the phase component φ of output signal $U_{OUT}$ is related to the direction of displacement φ, and the magnitude component $U_m$ of output signal $U_{OUT}$ is related to the magnitude of displacement ρ. Depending on the embodiment, the reactance X can be a capacitance, an inductance, or a combination of capacitance and inductance.

Figure 10:
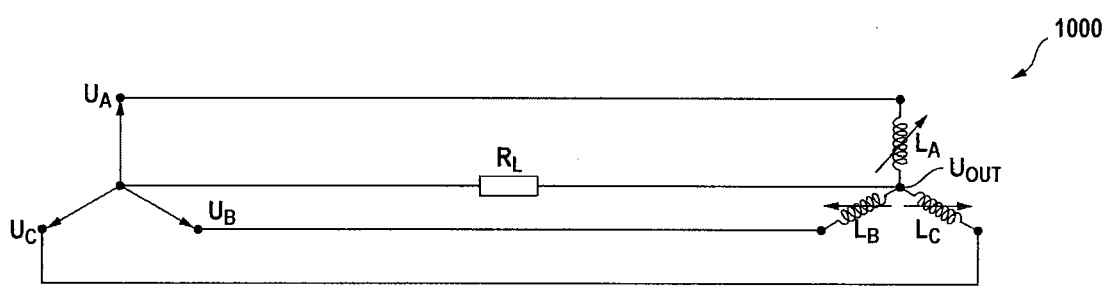
FIG. 10 is a simplified schematic diagram illustrating an inductive sensor of radial position according to an alternative embodiment of the present invention.

FIG. 10 is a simplified schematic diagram illustrating an inductive sensor 1000 according to an embodiment of the present invention. As shown, sensor 1000 is substantially similar to sensor 900 of FIG. 9, with the variable capacitor reactances $X_A$, $X_B$, and $X_C$ replaced by variable inductors $L_A$, $L_B$, and $L_C$, respectively. In a specific embodiment, the phase component φ of output signal $U_{OUT}$ is related to the direction of displacement φ, and the magnitude component $U_m$ of output signal $U_{OUT}$ is related to the magnitude of displacement ρ. To illustrate an application of this embodiment, a specific example of an inductive sensor for radial position is discussed below.

Figure 11:
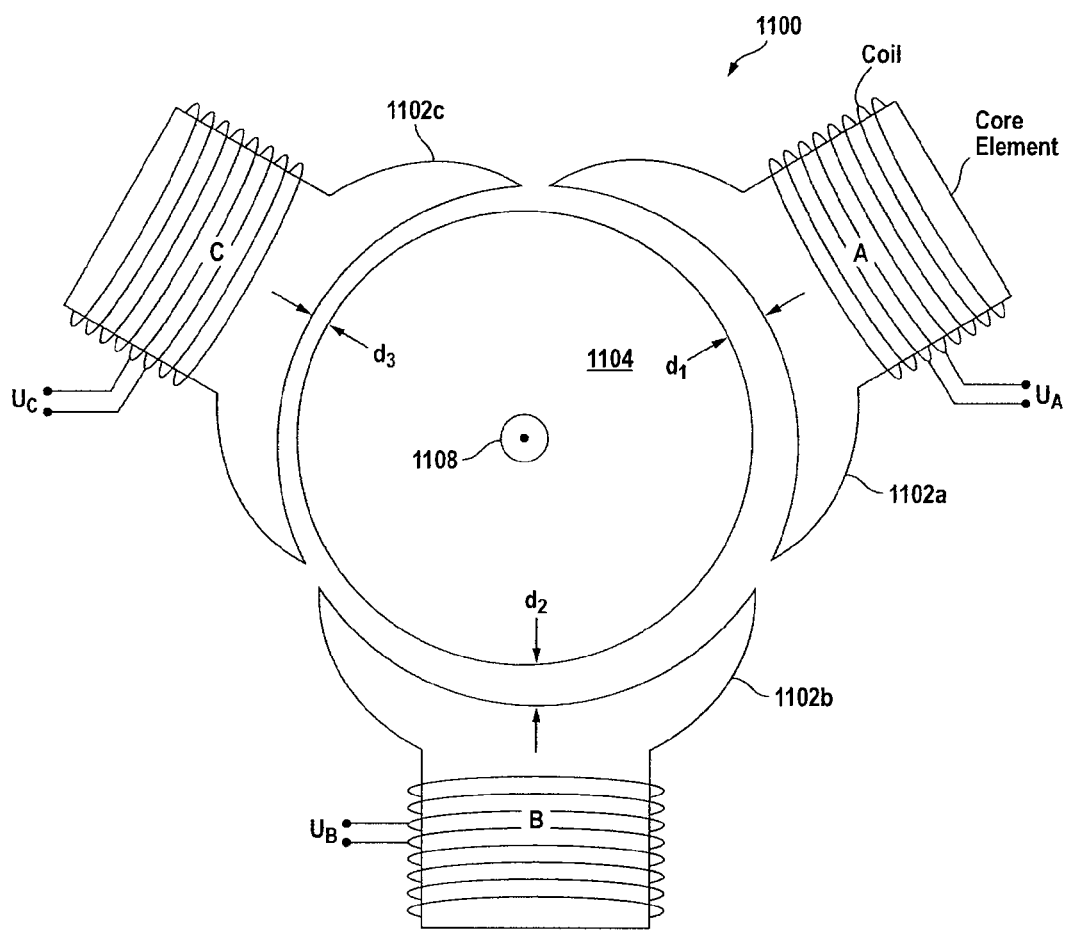
FIG. 11 is a simplified diagram illustrating an inductive sensor of radial position according to an alternative embodiment of the present invention.

FIG. 11 is a simplified top view diagram illustrating an example of an inductive sensor of radial position 1100 in accordance with an alternative embodiment of the present invention. A three-phase sensor will be described; however, it will be apparent that the present invention can be embodied in an N-phase sensor. The sensor 1100 comprises three emitters 1102a, 1102b, and 1102c, which collectively constitute the non-rotating emitting element of the sensor. In this embodiment of the present invention, the emitters 1102a, 1102b, and 1102c are electromagnets. Each emitter 1102a, 1102b, and 1102c comprises a ferromagnetic core about which a coil is wound. The harmonic multi-phase input signals $U_A$, $U_B$, and $U_C$ discussed above are respectively provided to the coils of emitters 1102a, 1102b, and 1102c. The resulting electromagnetic fields are magnetic in nature, and can also be referred to simply as magnetic fields.

The rotating element 1104 is shown in FIG. 11 and is configured for rotation about an axis of rotation which extends perpendicularly with respect to the drawing sheet. As shown, the rotating element 1104 is connected to a shaft 1108, which in turn can be connected to a rotating device for which knowledge of its radial position is desired. The rotating element 1104 and the shaft 1108 each is of a material that is characterized by a magnetic permeability μ that may or may not be equal to each other, thus providing a path of magnetic flux between the rotating element and the shaft.

Figure 12:
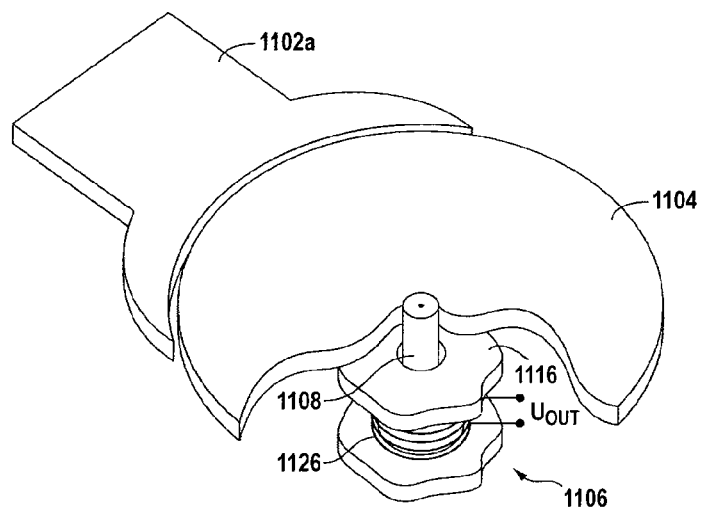
FIG. 12 simplified perspective view diagram illustrating additional details of the sensor of FIG. 1.

FIG. 12 is a simplified perspective view diagram illustrating a portion of sensor 1100 according to an embodiment of the invention. As shown, the non-rotating receiving element 1106 comprises a stationary bobbin 1116 about which a coil of wire 1126 is wound. The bobbin 1116 is disposed around and spaced apart from shaft 1108, allowing the shaft to rotate while the bobbin remains stationary. An induced current flow through the coil of wire 1126 can be measured and used to provide the single output signal $U_{OUT}$.

Operation of the inductive sensor 1100 is similar to operation of capacitive sensor 410 discussed above. When the coils of the emitters 1102a, 1102b, and 1102c of sensor 1100 are respectively energized by the time-varying multiphase input signals $U_A$, $U_B$, and $U_C$, each emitter element will emit an electromagnetic field. In the case of inductive sensor 1100, the electromagnetic fields are magnetic in nature. As the rotating element 1104 rotates in proximity to each of the emitters 1102a, 1102b, 1102c, the magnetic fields emanating from the emitters will be coupled by magnetic induction to the rotating element. This creates a magnetic field in the rotating element 1104 and in the shaft 1108. Since the input signals $U_A$, $U_B$, and $U_C$ are time-varying signals, the magnetic field created in the rotating element 1104 and the shaft 1108 likewise is time-varying. The varying magnetic field emanating from the shaft 1108 induces a current in the coil of the receiving element 1106. The resulting current flow in the coil is measured as the single output signal $U_{OUT}$.

When the axis of rotation of rotating element 1104 is displaced from a center position, the magnetic coupling of rotating element with the magnetic fields among the emitters 1102a, 1102b, 1102c changes. Suppose, for example, in FIG. 11 that the center position of the rotating element 1104 is such that it is equidistant from emitters 1102a, 1102b, 1102c; e.g., $d_1=d_2=d_3$. Suppose further that the rotating element 1104 is displaced from a reference position such that the distances between the rotating element 1104 and the emitters 1102a, 1102b, 1102c are not equal. If, as shown in the figure, the rotating element 1104 is displaced so as to be closer to emitter 1102c and further from emitters 1102a and 1102b, then the magnetic coupling between the emitter 1102c and the rotating element will be increased while the magnetic coupling between the rotating element and the emitters 1102a and 1102b will be decreased. The magnetic field created in the rotating element 1104, and hence the output signal $U_{OUT}$, will include primarily of the contribution of the magnetic coupling of the magnetic field produced by emitter 1102c, and to a lesser degree contributions from emitters 1102a and 1102b. If the rotating element 1104 displaced closer to emitters 1102a and 1102b than to emitter 1102c, then the magnetic field created in the rotating element and hence the output signal $U_{OUT}$, will result from contributions from the magnetic fields of emitters 1102a and 1102b, and to a lesser degree from emitter 1102c. The radial displacement of the axis of rotation can be characterized by an angular component and a radial component; i.e., using polar coordinates. When the output signal $U_{OUT}$ is a time-varying signal as discussed above, then the phase of the output signal is proportional to the angular component of the displacement, and the magnitude of the output signal is proportional to the radial component of the displacement.

Both the capacitive and inductive sensors disclosed above are governed by the principles of electromagnetic theory. However, differences in technical properties and construction will dictate their suitability in different areas of use. For example, the capacitive sensor is simple in construction, and lends itself to implementation using mass production techniques including microelectronic manufacturing and nanotechnology fabrication.

Inductive radial position sensors, on the other hand, require the manufacture of coil windings. It is well known fact, that systems with windings are not easily adapted for microelectronic manufacturing techniques. Nonetheless, inductive position sensors still find use in certain applications, including for example electromechanical devices, such as brushless DC motors and magnetic bearings motors, where radial position information is necessary for proper operation. Inductive sensors also produce a stronger output signal, and thus generally offer better signal to noise performance as compared capacitive sensors.

Figures 13A, 13B, 13C:
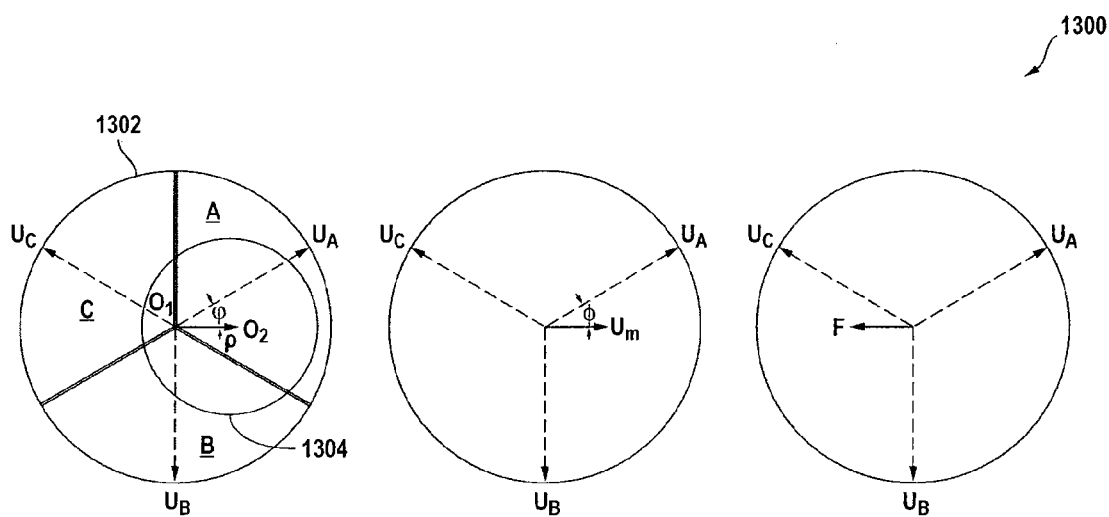
FIG. 13 is a simplified view diagram illustrating a method for radial position sensing and correction according to another embodiment of the present invention.

FIG. 13 is a simplified view diagram illustrating a method for radial position sensing and correction according to another embodiment of the present invention. As shown in FIG. 13A, an emitting element 1302 includes three electrically isolated signal sources A, B, and C. The center $O_1$ of the emitting element 1302 is aligned to an initial reference point of the mechanical system. The rotating element 1304 has an axis of rotation $O_2$ which was originally aligned to $O_1$, but has now displaced radially to the new position $O_2$. According to an embodiment of the present invention, the displacement vector from $O_1$ to $O_2$ is characterized in polar coordinates by a radial component ρ and an angular component ϕ. FIG. 13B is a simplified vector diagram showing polyphase input signals $U_A$, $U_B$, and $U_C$. In a specific embodiment, signals $U_A$, $U_B$, and $U_C$ are coupled to isolated regions A, B, and C, respectively. FIG. 13B also includes a vector diagram of output signal $U_{OUT}$ which is shown to have a magnitude $U_m$ and a phase angle ϕ. As discussed above, the radial displacement can be derived from the output vector. FIG. 13C shows a vector diagram of a corrective force F, which can be applied to restore the rotating element to the original position of the axis of rotation. In a specific embodiment, the corrective force F is in the opposite direction of the radial displacement vector characterized by magnitude $U_m$ and phase angle ϕ.

In a specific embodiment, the corrective force F can be determined according to the following process.
Step 1:
 If $U_m=0$, no control
 If $U_m>0$, control start
Step 2:
 If ϕ=0° or 360°: increase power of $U_B$ and $U_C$ ($U_B=U_C$)
 If 0°<ϕ<60°: increase power of $U_C$ and $U_B$ ($U_C>U_B$)
 If ϕ=60°: increase power of $U_C$
 If 60°<ϕ<120°: increase power of $U_C$ and $U_A$($U_C>U_A$)
 If ϕ=120°: increase power of $U_A$ and $U_C$(A=C)
 If 120°<ϕ<180°: increase power of $U_A$ and $U_C$($U_A>U_C$)
 If ϕ=180°: increase power of $U_A$
 If 180°<ϕ<240°: increase power of $U_A$ and $U_B$($U_A>U_B$)
 If ϕ=240°: increase power of $U_A$ and $U_B$($U_A=U_B$)
 If 240°<ϕ<300°: increase power of $U_B$ and $U_A$($U_B>U_A$)
 If ϕ=300°: increase power of $U_B$
 If 300°<ϕ<360°: increase power of $U_B$ and $U_C$($U_B>U_C$).

In some applications (e.g., motors), the inductive sensor according to the present invention can simplify the design because the function of torque production and the function of obtaining an information signal indicative of angular position of the rotor use the same system of stator poles and windings. This advantageous aspect of the present invention arises from the constructional similarities between a motor and a sensor according to the present invention. Both utilize a multi-phase excitation system and have corresponding poles and windings. In this case, the sensor may not have separate poles with windings, and the general construction of a combined motor and sensor can be effectively simplified. This makes the inductive sensor of the present invention an attractive design element for use in control of electromechanical devices.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A radial position sensor comprising:
a rotatable element configured to rotate about an axis of rotation;
a non-rotating emitting element configured to provide a plurality of electromagnetic fields; and
a non-rotating receiving element configured to receive the plurality of electromagnetic fields;
the rotatable element disposed in juxtaposition to the non-rotating emitting element and to the non-rotating signal receiving element,
the plurality of electromagnetic fields produced by the non-rotating emitting element being electromagnetically coupled to the non-rotating receiving element through the rotatable element,
the electromagnetic coupling of the plurality of electromagnetic fields between the non-rotating emitting element and the non-rotating receiving element varying when the axis of rotation of the rotatable element is radially displaced from a first position to a second position,
wherein the non-rotating receiving element produces an output signal in response to exposure to the plurality of electromagnetic fields,
wherein an amplitude of the output signal is proportional only to a magnitude of displacement of the axis of rotation from the first position to the second position,
wherein a phase of the output signal is proportional only to an angle of displacement of the axis of rotation from the first position to the second position.

2. The sensor of claim 1 wherein the non-rotating emitting element is energized by a multiphase excitation signal.

3. The sensor of claim 1 wherein the non-rotating emitting element comprises a electrically isolated emitters, each emitting one of the electromagnetic fields.

4. The sensor of claim 3 wherein each of the plurality of electrically isolated emitters is configured to receive a respective one of a corresponding plurality of time-varying input electrical signals.

5. The sensor of claim 4 wherein the plurality of time-varying input electrical signals comprise three time-varying electrical signals that are 120° out of phase from one another.

6. The sensor of claim 1 wherein the rotatable element is characterized by a disk shape or a cylindrical shape.

7. The sensor of claim 1 wherein the non-rotating emitting element and the non-rotating receiving element are capacitively or inductively coupled.

8. The sensor of claim 1 wherein the non-rotating emitting element and the non-rotating receiving element are inductively coupled.

9. A radial position sensor comprising:
a plurality of emitters, the emitters being electrically isolated from each other, each of the plurality of emitters being configured to receive a respective one of a corresponding plurality of time-varying input electrical signals;
a receiving element disposed in juxtaposition to each of the plurality of emitters, the receiving element being coupled to each of the plurality of emitters by a respective electrical reactance;
a rotatable element disposed between the emitters and the receiving element, the rotatable element being configured to rotate about an axis of rotation; and
an output terminal coupled to the receiving element for providing a time-varying output signal, a phase of the time-varying output signal being proportional only to an angular component of a radial displacement, an amplitude of the time-varying output signal being proportional only to a magnitude of the radial displacement of the rotatable element.

10. The sensor of claim 9 wherein the plurality of emitters are disposed symmetrically about the axis of rotation.

11. The sensor of claim 9 wherein the receiving element is aligned substantially perpendicularly with respect to the axis of rotation.

12. The sensor of claim 9 wherein the plurality of time-varying input electrical signals comprise N time-varying electrical signals that are 360°/N out of phase from one another, where N is an integer.

13. The sensor of claim 9 wherein the rotatable element is characterized by a disc shape or a cylindrical shape.

14. The sensor of claim 9 wherein the rotatable rotating-element comprises a dielectric material.

15. The sensor of claim 9 wherein the receiving element is capacitively coupled or inductively coupled to each of the plurality of emitters.

16. The sensor of claim 9 wherein the rotatable element is of a material that is characterized by a magnetic permeability.

17. A radial position sensor comprising:
a emitting element comprising a plurality of electrically isolated emitters, each emitter configured to produce a magnetic field when it is energized, thereby producing a plurality of magnetic fields when two or more of the emitters are energized;
a receiving element; and
a rotatable disposed in juxtaposition to the emitting element and to the receiving element, the rotatable element configured to rotate about an axis of rotation, wherein a radial displacement of the rotatable element causes a change in electromagnetic coupling between the plurality of magnetic fields and the receiving element when the plurality of emitters are energized,
the receiving element producing an output signal when the plurality of magnetic fields are electromagnetically coupled thereto by the rotatable element,
wherein an amplitude of the output signal is proportional only to a magnitude of a radial displacement of the rotatable element, wherein a phase of the output signal is proportional only to an angle of the displacement of the rotatable element.

18. The sensor of claim 17 wherein each emitter comprises an electromagnet and the receiving element comprises a coil, wherein the plurality of magnetic fields produced by the emitters are coupled to the coil thus inducing a flow of current in the coil, the output signal being a measure of the flow of current.

19. The sensor of claim 17 wherein the rotatable element is substantially coplanar with the emitting element, wherein the rotatable element is connected to a shaft, wherein the receiving element is disposed about the shaft.

20. A radial position sensor comprising:
a emitting element comprising a plurality of electrically isolated emitters, each emitter configured to produce an electric field when it is energized, thereby producing a plurality of electric fields when two or more of the emitters are energized;

a receiving element; and a rotatable element disposed in juxtaposition to the emitting element and to the receiving element, the rotatable element configured to rotate about an axis of rotation, wherein when the rotatable element is radially displaced a change occurs in the electromagnetic coupling between the plurality of electric fields and the receiving element when the plurality of emitters are energized, the receiving element producing an output signal when the plurality of electric fields are electromagnetically coupled thereto by the rotatable element, wherein an amplitude of the output signal is proportional only to a magnitude of a radial displacement of the rotatable element, wherein a phase of the output signal is proportional only to an angle of the displacement of the rotatable element.

21. The sensor of claim 20 wherein each emitter comprises a conductive region and the receiving element comprises a conducting plate, wherein the plurality of electric fields produced by the emitters are coupled to the conducting plate thus inducing a voltage in the conducting plate, the single output signal being a measure of the voltage.

22. The sensor of claim 20 wherein the rotatable element is substantially parallel with the emitting element, wherein the rotatable element is connected to a shaft, wherein the receiving element is substantially perpendicularly disposed about the shaft.

* * * * *